US008165160B2

(12) United States Patent  (10) Patent No.: US 8,165,160 B2
Dunstan et al.  (45) Date of Patent: Apr. 24, 2012

(54) METHOD AND SYSTEM TO VALIDATE A WRITE FOR A DEVICE ON A SERIAL BUS

(75) Inventors: Robert A. Dunstan, Forest Grove, OR (US); John W. Horigan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1413 days.

(21) Appl. No.: 11/540,837

(22) Filed: Sep. 29, 2006

(65) Prior Publication Data

US 2008/0082544 A1  Apr. 3, 2008

(51) Int. Cl.
*H04J 3/16* (2006.01)
(52) U.S. Cl. ........ 370/471; 370/474; 707/697; 714/758; 714/807
(58) Field of Classification Search .............. 707/10, 707/697; 714/752–758, 807; 370/470
See application file for complete search history.

(56) References Cited

U.S. PATENT DOCUMENTS

| | | | | |
|---|---|---|---|---|
| 4,835,731 | A * | 5/1989 | Nazarenko et al. | 455/508 |
| 5,710,756 | A * | 1/1998 | Pasternak et al. | 370/216 |
| 5,964,845 | A * | 10/1999 | Braun et al. | 713/375 |
| 6,327,688 | B1 | 12/2001 | Stolitzka et al. | |
| 6,385,210 | B1 * | 5/2002 | Overberg et al. | 370/447 |
| 6,460,163 | B1 | 10/2002 | Bowman et al. | |
| 2002/0080416 | A1 * | 6/2002 | Quine | 358/405 |
| 2005/0097361 | A1 * | 5/2005 | Apostolopoulos et al. | 713/201 |
| 2005/0257117 | A1 | 11/2005 | Chiang | |
| 2005/0282501 | A1 | 12/2005 | Oura | |
| 2006/0059400 | A1 | 3/2006 | Clark et al. | |
| 2006/0161764 | A1 * | 7/2006 | Alexander et al. | 713/2 |
| 2006/0248370 | A1 * | 11/2006 | Almasi et al. | 714/4 |
| 2007/0074085 | A1 * | 3/2007 | Ferguson et al. | 714/704 |
| 2007/0124415 | A1 * | 5/2007 | Lev-Ran et al. | 709/217 |
| 2008/0043732 | A1 * | 2/2008 | Desai et al. | 370/389 |

FOREIGN PATENT DOCUMENTS

| | | |
|---|---|---|
| GB | 2 410 161 A | 7/2005 |
| KR | 1020010011471 A1 | 2/2001 |
| WO | 2006/118711 A1 | 11/2006 |

OTHER PUBLICATIONS

"PCT International Search Report of the International Searching Authority", mailed Feb. 11, 2008, for PCT/US2007/079987, 3pgs.
"Patents Act 1977: Combined Search and Examination Report under Sections 17 & 18(3)", dated Mar. 10, 2011, for Application No. GB1103368.5, 3pgs.
"Patents Act 1977: Examination Report under Section 18(3)", dated Oct. 8, 2010, for Application No. GB0904298.7, 3pgs.

* cited by examiner

*Primary Examiner* — Seema S Rao
*Assistant Examiner* — Sai-Ming Chan
(74) *Attorney, Agent, or Firm* — Buckley, Maschoff & Talwalkar LLC

(57) ABSTRACT

A method and system, the method including, in some embodiments, calculating, by a message originator, a first check sum byte, appending the first check sum byte to the message, sending the message from the originator to a client over a single wire serial bus, and determining, by the client, a validity of the message from the originator by comparing the first check sum byte with a second check sum calculated by the client.

12 Claims, 6 Drawing Sheets

300

```
┌─────────────────────────────────────┐
│   CALCULATE, BY A MESSAGE ORIGINATOR,│
│       A FIRST CHECK SUM BYTE         │
│                                  305 │
└─────────────────────────────────────┘
                  │
                  ▼
┌─────────────────────────────────────┐
│      APPEND THE FIRST CHECK SUM      │
│     CHECK SUM BYTE TO A MESSAGE      │
│                                  310 │
└─────────────────────────────────────┘
                  │
                  ▼
┌─────────────────────────────────────┐
│   SEND THE MESSAGE FROM THE ORIGINATOR TO │
│    A CLIENT OVER A SINGLE WIRE SERIAL BUS │
│                                  315 │
└─────────────────────────────────────┘
                  │
                  ▼
┌─────────────────────────────────────┐
│    DETERMINE, BY THE CLIENT, A VALIDITY OF│
│     THE MESSAGE FROM THE ORIGINATOR BY    │
│   COMPARING THE FIRST CHECK SUM BYTE WITH A│
│   SECOND CHECK SUM CALCULATED BY THE CLIENT│
│                                  320 │
└─────────────────────────────────────┘
```

```
┌─────────────────────────────────────────┐
│ SEND A MESSAGE FROM A MESSAGE ORIGINATOR │
│ TO A CLIENT OVER A SINGLE WIRE SERIAL BUS│
│                                      505 │
└─────────────────────────────────────────┘
                    │
                    ▼
┌─────────────────────────────────────────┐
│ DETECT, BY THE ORIGINATOR, A INVALID CHECK│
│ SUM BYTE RETURNED FROM THE CLIENT IN REPLY│
│ TO THE MESSAGE SENT BY THE ORIGINATOR    │
│                                      510 │
└─────────────────────────────────────────┘
                    │
                    ▼
┌─────────────────────────────────────────┐
│ ABORT, BY THE ORIGINATOR, THE MESSAGE    │
│ WITHIN A PREDETERMINED TIMEFRAME         │
│                                      515 │
└─────────────────────────────────────────┘
                    │
                    ▼
┌─────────────────────────────────────────┐
│ DETERMINE THE MESSAGE IS INVALID BY THE  │
│ CLIENT BASED ON THE ABORTING OF THE      │
│ MESSAGE BY THE ORIGINATOR WITHIN THE     │
│ PREDETERMINED TIMEFRAME                  │
│                                      520 │
└─────────────────────────────────────────┘
```

*FIG. 5*

METHOD AND SYSTEM TO VALIDATE A WRITE FOR A DEVICE ON A SERIAL BUS

BACKGROUND

A single wire bus may be used to communicate data between host and client devices. Commands communicated between the host and the client devices may, in some instances, have a significant operational impact on the host, the client devices, and associated devices, systems, platforms, and operating environments. In general, data may be written and read between the host and the client devices. In some instances, a message including a command may be sent from the host to one or more of the client devices to invoke an action by the client device. Due to errors in communication, a message sent over the single wire bus may not be received correctly by a client device and/or data returned from the client device may be incorrect.

According to some write-read protocols, a message originator (e.g., a host) may receive an indication that a targeted client device received the message correctly and data returned by the client device is correct. However, the client device may still accept and act on an invalid message based on a communications error that the client device itself cannot detect.

BRIEF DESCRIPTION OF THE DRAWINGS

FIG. 3 is a flow diagram of a process, in accordance with some embodiments herein;

FIG. 5 is a flow diagram of a process, in accordance with some embodiments herein

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
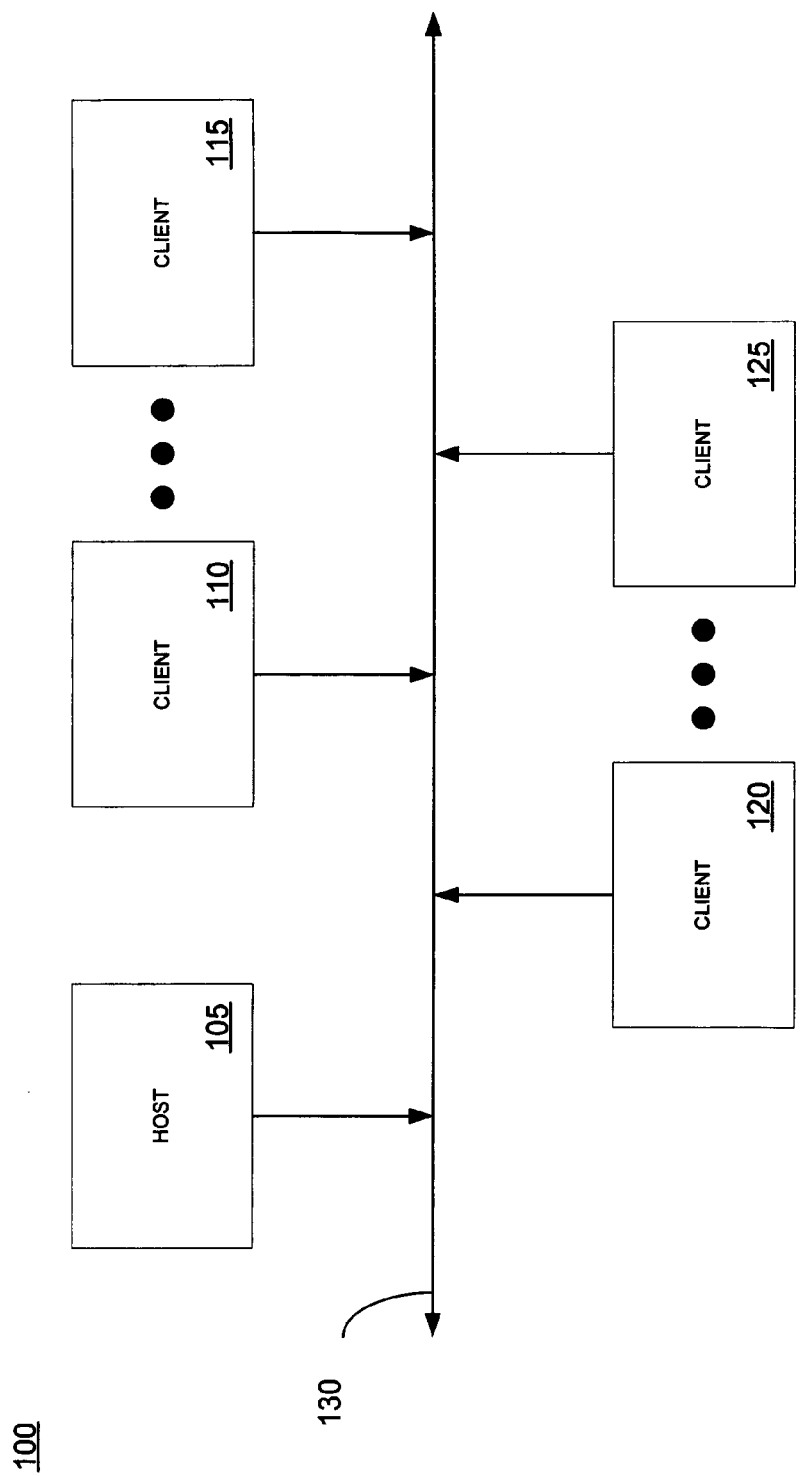
FIG. 1 is an exemplary depiction of a system, in accordance with some embodiments herein.

Referring to FIG. 1, there is shown an exemplary schematic diagram of a single wire bus communication system 100, in accordance with some embodiments herein. In some embodiments, bus 130 may include a single wire serial bus. Host 105 is connected to bus 130. A plurality of client devices 110, 115, 120, and 125 are also connected to bus 130. Host 105 and client devices 110, 115, 120, and 125 may convey digital data between the host and client devices over bus 130. One or more client devices such as, for example client devices 110 and 115, may have fixed addresses. One or more client devices such as, for example client devices 120 and 125, may have dynamically assigned addresses. Thus, some embodiments system may 100 include a combination of client devices having fixed and dynamically assigned addresses.

While the single wire bus system shown in FIG. 1 includes one host and multiple client devices, some embodiments of a system 100 may include one host and one client device. In some embodiments, system 100 may include one message originator and in other embodiments system 100 may include multiple message originators.

In some embodiments, a message for bus 130 of system 100 conforms to a protocol including a header and data. The message protocol may set the message data rate, provide information regarding the message, and ensure data integrity. For example, timing negotiation may be used to set a bit rate for the message, an address of a targeted client device may be specified, and other characteristics of the message may be provided in the message header.

Figure 2:
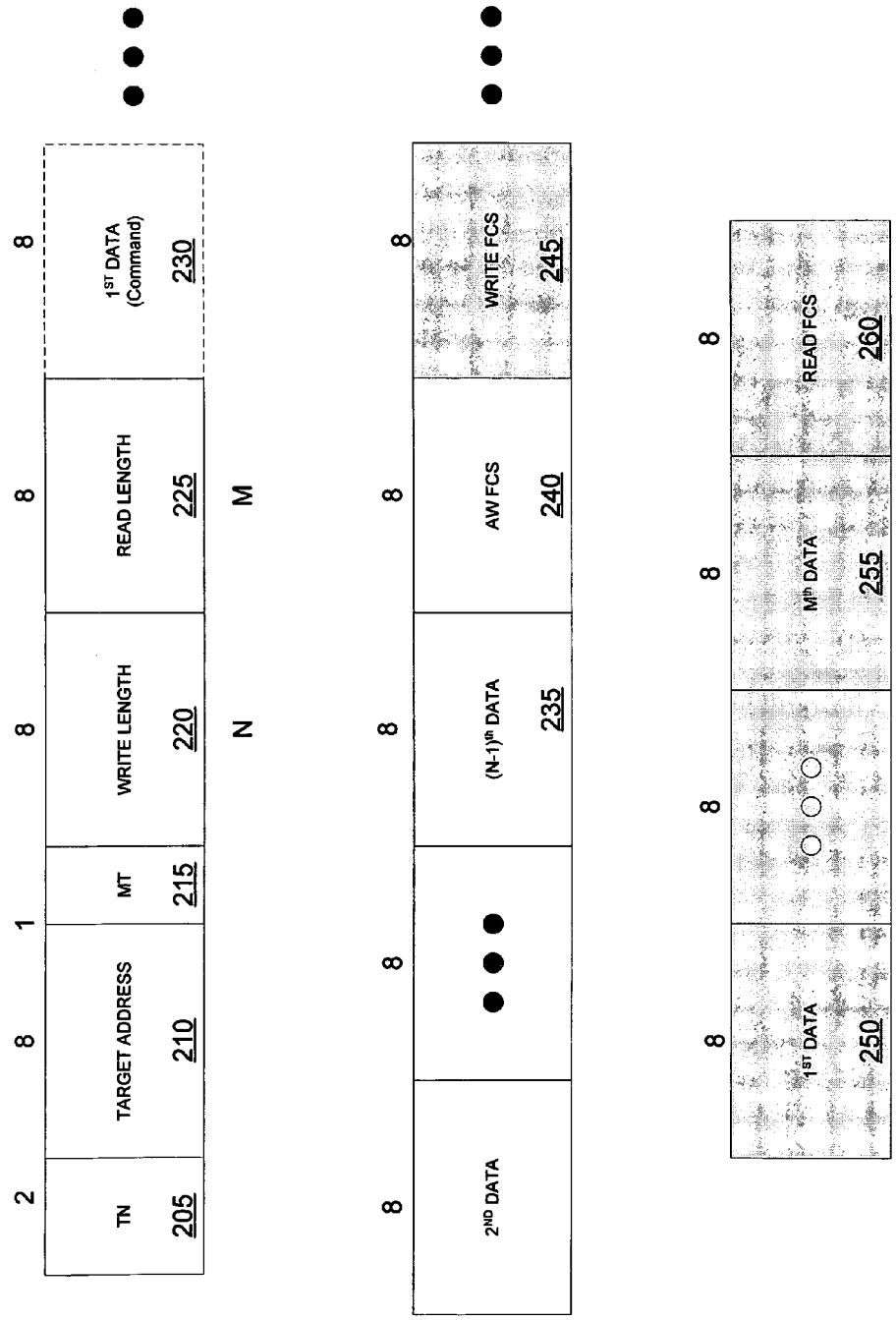
FIG. 2 is an exemplary depiction of message relating to some embodiments herein.

FIG. 2 shows an exemplary write-read protocol 200, in accordance with some embodiments herein. In particular, write-read protocol 200 provides for messaging between devices on bus 130. Write-read protocol 200 first writes data between a message originator (e.g., host 105) and a target client (e.g., one or more of clients 110, 115, 120, and 125).

In accordance with write-read protocol 200, a message includes a header and data components. The header includes address Timing Negotiation (TN) bits 205 that set the bit rate for the address portion of the message (2 bits); a target address 210 that specifies the address of the target device (8 bits); a Message Timing (MT) negotiation bit 215 that is used to negotiate timing between the message originator and the targeted (e.g. addressed) client device(s) (1 bit) for the remaining portion of the message; a Write Length 220 that specifies N bytes of data the originator intends to send (8 bits); and a Read Length 225 that specifies the M bytes of data the originator expects to receive (8 bits). The N bytes of write data 230-240 are to be written to the target device and the M bytes of read data 250-255 are to be read back from the target client.

In some embodiments, both of the Write Length and Read Length may be zero. In such an instance the message is referred to as a null message and defines a device 'ping' that is supported by all devices connected to bus 130.

The write data comprising N bytes of data may optionally include a command. In some embodiments, the command is the first byte 230 of the write data.

In some embodiments, each message requires at least one frame check sum byte. The check sum byte provides a mechanism to ensure reliable exchanges of data between the originator and the target client(s). The message originator and the client device(s) both perform check sum calculations. In some embodiments, the check sum bytes herein may be obtained as a result of a frame check sequence (FCS) 8-bit cyclic redundancy check (CRC) of each data block preceding the CRC.

In some embodiments, the 8-bit cyclic redundancy check used by the Write FCS and Read FCS herein may be represented by the polynomial $C(x)=x^8+x^2+x+1$. It should be appreciated that the CRC used in the calculation of the check sums herein may include CRCs other than the CRC-8 polynomial.

The Write FCS in the message, in some embodiments, does not include TN bits 205 or MT bits 215. Write FCS 245 does however include the address byte 210, Write Length byte 220, and Read Length byte 225 in its computation.

In some embodiments, a Write FCS byte 245 is returned to message originator 105 from the target client after the header and N data bytes (e.g., 230-240) are written. The Write Length byte in the header is used by the target client to determine when the target client should return the Write FCS. The target client (e.g., client 110) is required to return the Write FCS over the header, even if the Write Length field is zero (i.e., no additional data bytes are written).

When data is read from the target client(s), a Read FCS 260 follows the read data (e.g., bytes 250-255). Read FCS byte 260 is driven by the target client. Read Length byte 225 is used by the target client to determine the number of data bytes the client is required to supply to the message originator before returning Read FCS 260 over that data. Write FCS 245 and Read FCS 260 are not included as part of the read length.

Write FCS 245 and Read FCS 260 are supplied and driven by the target client(s). These FCSs supplied by the target client to the originator provide originator 105 with mechanisms to determine whether a write is successful and whether read data is received correctly.

In some embodiments herein, a check sum Assured Write (AW) FCS 240 is appended to the message header and the write data. Check sum 240 may be used by the target client to validate the contents of the message. The target client may thus use AW FCS 240 to verify the message contents before the client device acts on the message.

In some embodiments, AW (Assured Write) FCS 240 is the result of result of an 8-bit cyclic redundancy check (CRC). In some embodiments, AW FCS 240 may use the same 8-bit cyclic redundancy check polynomial $C(x)=x^8+X^2+x+1$ used in the calculation of Write FCS 245 and Read FCS 260.

It is noted that the CRC used in the calculation of the AW FCS 240 may use CRCs other than the CRC-8 polynomial. It is also noted that appending a CRC-8 and then recalculating a new CRC-8 is a tautology always resulting in a zero, in the instance a single CRC generator is used in the client device. In some embodiments herein, the client device may include, for example, for purposes of ease of implementation and/or cost containment, one CRC generator.

In some example instances a message from originator 105 may command the message's target device to perform an action such as, for example, configuring the target client to power off for a period of time. Without some method, mechanism, or system to verify the contents of the message, the target client may perform irreversible or potentially harmful actions in response to incorrect or invalid messages. AW FCS 240 facilitates the target client verifying the validity of the message before the target client acts on the message. In this manner the target client of the preceding example may avoid, for example, mistakenly taking itself off of the bus.

Still referring to FIG. 2, AW FCS 240 is included in the message as the $N^{th}$ write data byte within the write data. In some embodiments, after the FCS calculation of the $(N-1)^{st}$ write data byte a preliminary FCS calculation of the AW FCS is modified by the originator. The preliminary FCS calculation of the AW FCS is modified so that Write FCS 245 returned by the target client device in the next byte is non-zero. In embodiments the same CRC calculation is used for both the AW FCS and the Write FCS, Write FCE 245 returned by the target client device would always be 0 (e.g., 0x00).

In some embodiments, the modification of the preliminary FCS is accomplished by inverting the most significant bit, msb, of the FCS calculation of the $(N-1)^{st}$ write data byte. In this manner if the FCS calculation of the $(N-1)^{st}$ data byte is 0xc4, then inverted the msb thereof would yield an AW FCS equal to 0x44.

In some embodiments, the use different CRC-8 algorithms to calculate the AW FCS and Write FCS values in the client avoids the issue of having to modify a check sum to avoid a subsequent check sum value of zero. That is, in some embodiments, the client may have two CRC generators that use different CRC algorithms.

As an example, a message with a command/data set of three bytes, 0x(10 e2 39) may have an AW FCS appended thereto to get an entire written sequence of 0x(20 04 00 10 e2 39 50), wherein 0x(20 04 00) comprises the header of the message. The target client device responds with a Write FCS byte of 0x89. The AW FCS increases the Write Length of the message by one and the AW FCS is added as the CRC-8 of the prior byte (0xd0) with the msb inverted to yield 0x50.

FIG. 3 depicts an exemplary flow diagram of a method 300, in accordance with some embodiments herein. At operation 305, a first check sum byte is calculated by a message originator. The first check sum corresponds to the AW FCS 240 depicted in FIG. 2. The first check sum is appended to a message from the message originator at operation 310. The message, including the first check sum, may correspond to the message protocol shown and discussed herein with respect to FIG. 2.

At operation 315, the message is sent from the originator to a client over a single wire serial bus. The bus provides communication between the originator and the client. The message includes a header and data. In some embodiments, the data includes N bytes of write data wherein the $N^{th}$ write data byte is the first check sum.

In some embodiments, a preliminary check sum calculation may be modified in a process of calculating the first check sum. The modification may be provided to obtain a non-zero value for an immediately subsequent check sum calculations. The modification process may be accomplished as part of or separately from other operations of process 300, including operation 305.

At operation 320, a determination may be made by the client regarding the validity of the message from the originator. The determination may be based on a comparison of the first check sum and a second check sum generated internally by the client. A match between the first check sum and the second check sum internally generated by the client may indicate the message contents are valid, whereas a non-match between the first check sum and the second check sum generated by the client may indicate the message contents are invalid. In the instance the message is determined to be invalid by the client using the first check sum, the client may respond by not acting on the message.

The use of the AW FCS in the write-protocol of the message provides a mechanism for the target client of the message to have a measure of assurance that the data received by the target client is correct/valid prior to committing to use the data.

Figure 4:
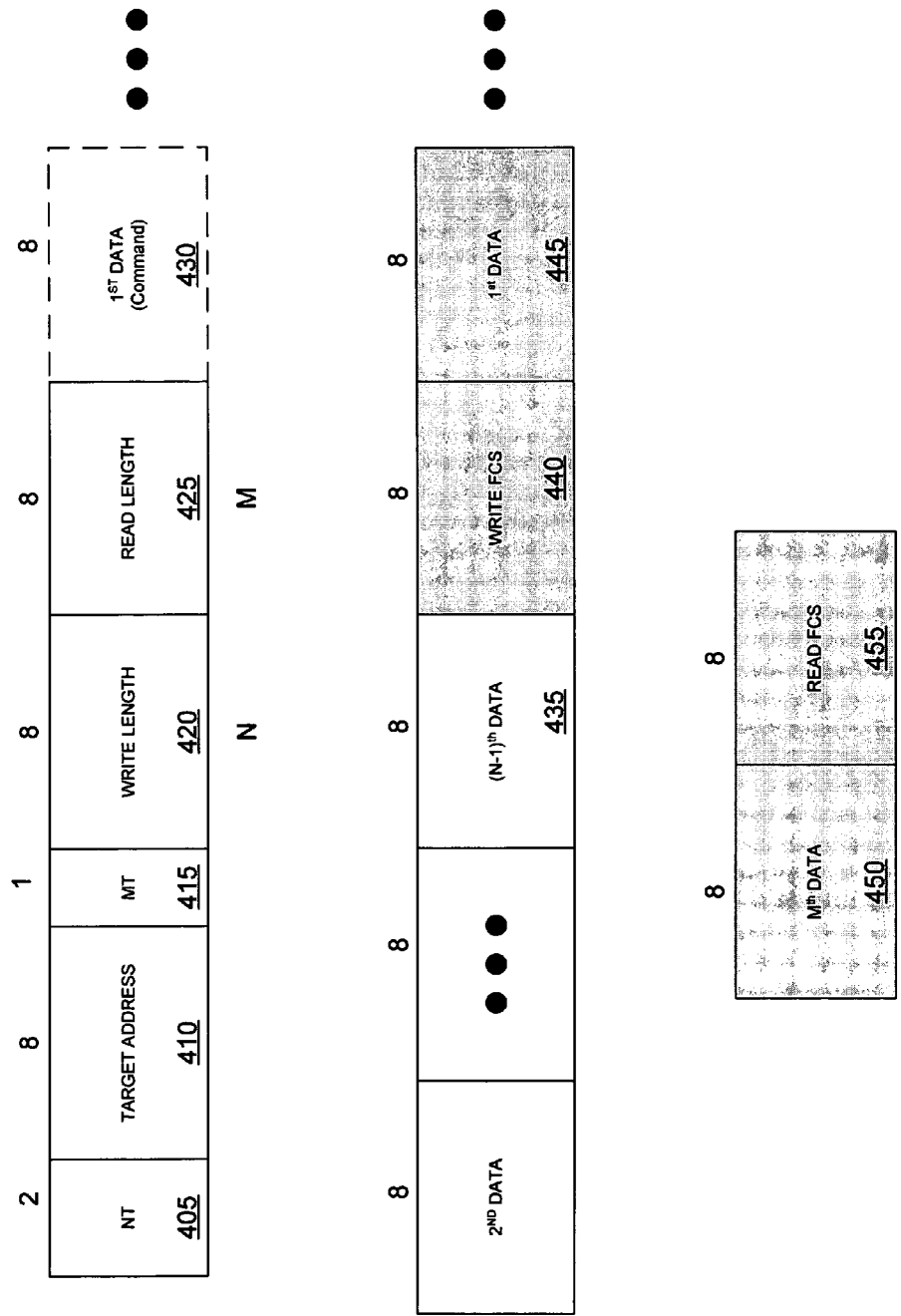
FIG. 4 is an exemplary depiction of message relating to some embodiments herein.

FIG. 4 shows an exemplary write-read protocol 400, in accordance with some embodiments herein. In particular, write-read protocol 400 may provide a mechanism by which a client can infer a message is incorrect/invalid based on a behavior of a message originator of a single wire bus system. Write-read protocol 400 may first write data between a message originator (e.g., host 105) and a target client (e.g., clients 110, 115, 120, and 125).

In accordance with write-read protocol 400, a message includes a header and data components. The header includes TN bits 405, a target address 410, a MT negotiation bit 415, a Write Length 420 that specifies N bytes of data the originator intends to send; and a Read Length 425 that specifies the M bytes of data the originator expects to receive. The N bytes of write data 430-440 are to be written to the target device and the M bytes of read data 450-455 are to be read back from the target device.

In some embodiments corresponding to write-read protocol 400, the Write Length may be zero but the Read Length is at least one byte.

Aspects of the header and data components of the message protocol 400 may be similar to the header and data components discussed herein with respect to FIG. 2. Accordingly, a discussion of similar aspects of protocol 400 already discussed elsewhere herein with respect to FIG. 2 are not again discussed in detail. Reference may be instead by referring to FIG. 2.

In some embodiments, as depicted in the exemplary flow diagram 500 of FIG. 5, a message adhering to write-read protocol 400 may be sent from the originator to a client over a single wire bus at operation 505. At operation 510, originator 105 may detect an invalid check sum byte return from the client in reply to the sending of the message from the originator. In some embodiments, the returned check sum corresponds to Write FCS 340.

A required behavior of the originator upon receipt of an invalid returned check sum (i.e., Write FCS) may be to invoke a master abort operation wherein the message is aborted. Further requirements may dictate that the abort occurs within a predetermined time period. In some embodiments, the predetermined time period corresponds to an immediately next byte cycle. The abort behavior of the originator connected to the bus may be used by a client connected to the bus to infer that the message is incorrect/invalid. Conversely, the absence of the abort operation may be construed as the message from the originator is correct or valid.

The predetermined period during which the originator must determine whether the returned check sum (i.e., Write FCS) is valid and invoke the abort operation may correspond to a read byte cycle. Accordingly, a message is sent from the originator and the check sum is returned from the target client device. During the reading of the first read data byte 345, the originator determines whether the returned check sum is valid and invokes the abort operation if it is invalid. Thus, it is has been shown why the read length is at least one byte, in some embodiments.

FIG. 5 depicts an exemplary flow diagram of a method 500, in accordance with some embodiments herein. At operation 505, a message is sent from a message originator to a client over a single wire serial bus. At operation 510, the originator detects an invalid check sum byte (e.g., Write FCS) returned from the client in reply to the message sent by the originator.

Upon determining the returned check sum is invalid or otherwise not correct, the originator aborts the message at operation 515. The originator makes the determination to abort the message within a predetermined time period. Based on the message abort actions of the originator, the client device may infer the Write FCS was valid or invalid.

Figure 6:
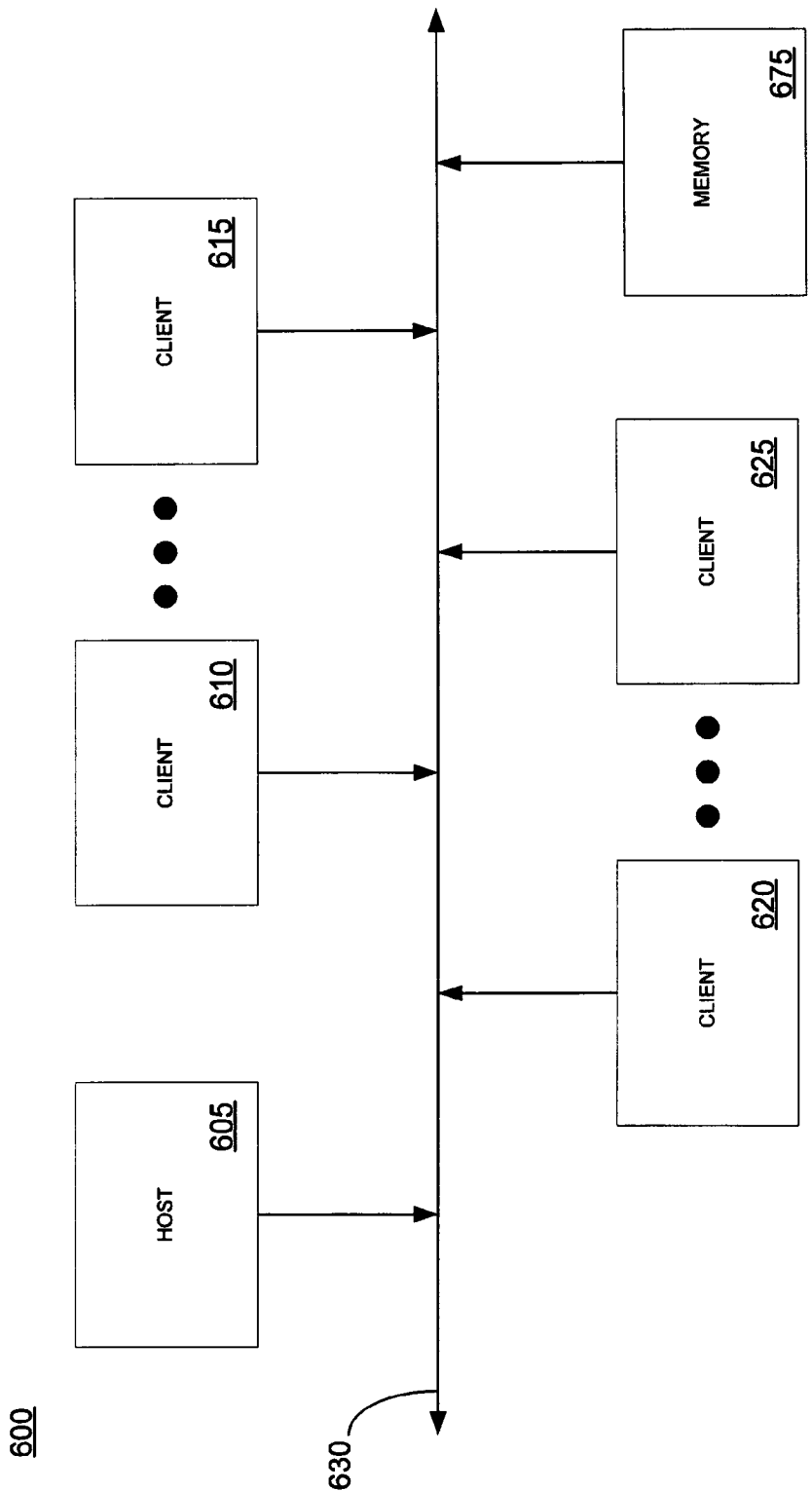
FIG. 6 is an exemplary depiction of a system, in accordance with some embodiments herein.

FIG. 6 is an exemplary schematic diagram of a single wire serial bus communication system 600, in accordance with some embodiments herein. Host 605 is connected to bus 630. A plurality of client devices 610, 615, 620, and 625 are also connected to bus 630. Host 605 and client devices 610, 615, 620, and 625 convey data between the host and client devices over bus 630. Client devices of system 600 may have fixed or dynamic addresses. System 600 may be similar in a number of ways to system 100. However, system 600 includes a memory module 675 connected to bus 630. Bus 630 may be used to write configuration information to memory module 675, not as a primary channel for reading/writing data from/to the memory. Memory module 675 may include, for example, data that may be acted upon, subject to the actions of the host and the client, and/or included in a message from the originator.

In some embodiments, system 600 may be compatible with the write-read protocols disclosed herein, including those discussed regarding FIGS. 2 and 4.

While the single wire bus system shown in FIG. 1 includes one host and multiple client devices, some embodiments of a single wire bus system herein may include one host and one client device. In some embodiments, a single wire bus system may include one message originator and in other embodiments a single wire bus system may include multiple message originators.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method comprising:
   calculating, by a message originator, a first check sum byte, the first check sum byte being calculated by the originator by modifying a result of a check sum byte calculation after a $(N-1)^{th}$ write data byte, wherein the modifying assures a first check sum byte returned by a client to the originator immediately after the sending of the first check sum by the originator has a non-zero value;
   appending the first check sum byte to a message including a header and N bytes of write data, the N-bytes of write data including the first check sum byte and the first check sum byte being appended to the message as the $N^{th}$ write data byte;
   sending the message from the originator to a client over a single wire serial bus; and
   determining, by the client, a validity of the message from the originator by comparing the first check sum byte included in the N bytes of write data with a second check sum byte calculated by the client.

2. The method of claim 1, wherein the client determines the message is valid when the first check sum byte is equal to the second check sum byte and the message is invalid when the first check sum byte is not equal to the second check sum byte.

3. The method of claim 1, wherein the first check sum byte and the second check sum byte comprise a frame check sequence (FCS) 8-bit cyclic redundancy check (CRC) of each of at least one data byte preceding the respective check sums.

4. The method of claim 1, wherein the header of the message further comprises an address, a read length, and a write length.

5. The method of claim 1, wherein the modifying comprises inverting a most significant bit of the result of the check sum byte calculation after the $(N-1)^{th}$ write byte.

6. A system comprising:
   a single wire serial bus;
   a message originator device connected to the bus, wherein the originator calculates a first check sum byte by modifying a result of a check sum byte calculation after a $(N-1)^{th}$ write data byte, wherein the modifying assures a first check sum byte returned by a client to the originator immediately after the sending of the first check sum by the originator has a non-zero value; appends the first check sum byte to a message including a header and N bytes of write data, the first check sum byte being appended to the message as the $N^{th}$ write data byte; and sends the message from the originator to a client over the single wire bus; and
   a client device connected to the bus, wherein the client device receives the message from the originator over the single wire bus and determines a validity of the message from the originator by comparing the first check sum byte included in the N bytes of write data with a second check sum byte calculated by the client.

7. The system of claim 6, wherein client determines the message is valid when the first check sum byte is equal to the second check sum byte and the message is invalid when the first check sum byte is not equal to the second check sum byte.

8. The system of claim 6, wherein the first byte and the second byte comprise an 8-bit cyclic redundancy check (CRC) of each of at least one data byte preceding the respective check sums.

9. The system of claim 6, wherein the header of the message further comprises an address, a read length, and a write length.

10. The system of claim 6, wherein the modifying comprises inverting a most significant bit of the result of the check sum byte calculation after the $(N-1)^{th}$ write byte.

11. A system comprising:
a single wire serial bus;
a message originator device connected to the bus, wherein the originator calculates a first check sum byte by modifying a result of a check sum byte calculation after a $(N-1)^{th}$ write data byte, wherein the modifying assures a first check sum byte returned by a client to the originator immediately after the sending of the first check sum by the originator has a non-zero value; appends the first check sum byte to a message including a header and N bytes of write data the first check sum byte being appended to the message as the $N^{th}$ write data byte, and sends the message from the originator to a client over the single wire bus;
a client device connected to the single wire bus, wherein the client device receives the message from the originator over the single wire bus and determines a validity of the message from the originator by comparing the first check sum byte included in the N bytes of write data with a second check sum calculated by the client; and
a memory module in communication with the client device.

12. The system of claim 11, wherein client determines the message is valid when the first check sum byte is equal to the second check sum byte and the message is invalid when the first check sum byte is not equal to the second check sum byte.

* * * * *